E. RIMAILHO.
APPARATUS FOR THROWING THE WHEELS INTO AND OUT OF ACTION OF A VEHICLE HAVING BOTH WHEELS AND ENDLESS TRACKS.
APPLICATION FILED OCT. 20, 1920.
1,395,144. Patented Oct. 25, 1921.
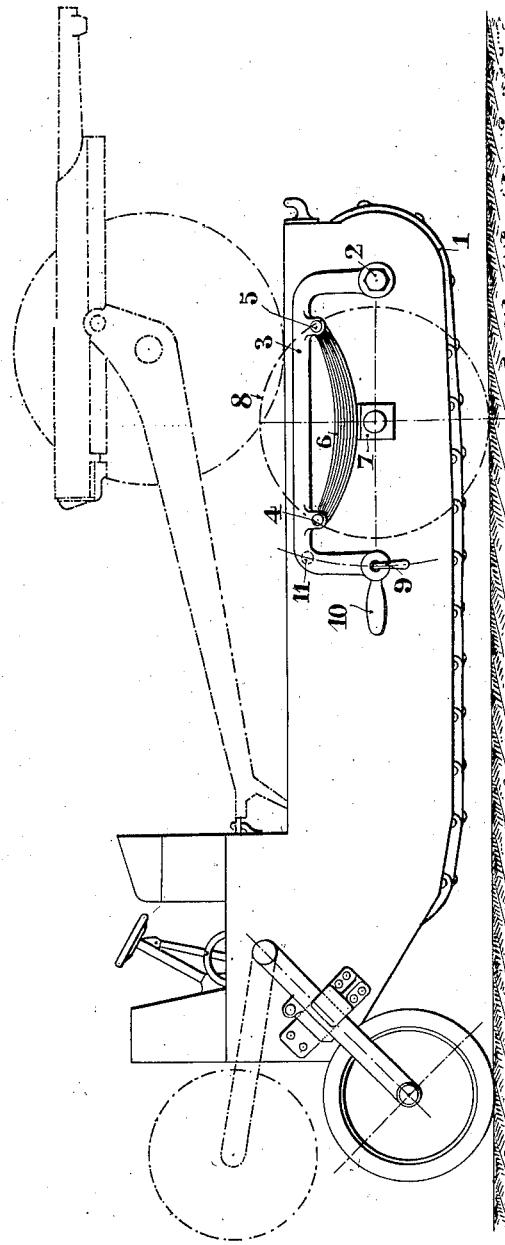
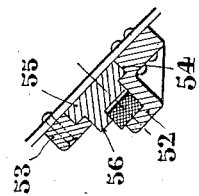
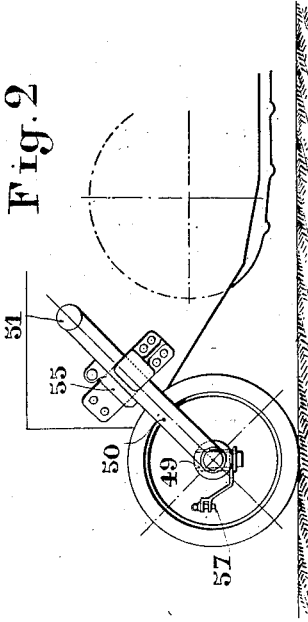
INVENTOR
EMILE RIMAILHO
BY
ATTORNEYS

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

APPARATUS FOR THROWING THE WHEELS INTO AND OUT OF ACTION OF A VEHICLE HAVING BOTH WHEELS AND ENDLESS TRACKS.

1,395,144.  Specification of Letters Patent.  Patented Oct. 25, 1921.

Original application filed November 22, 1919, Serial No. 339,903. Divided and this application filed October 20, 1920. Serial No. 418,327.

(GRANTED UNDER THE PROVISIONS OF THE ACT OF MARCH 3, 1921, 41 STAT. L., 1313.)

*To all whom it may concern:*

Be it known that I, EMILE RIMAILHO, a citizen of the French Republic, and residing in Paris, France, 12 Rue de la Rochefoucauld, have invented certain new and useful Improvements in and Relating to Apparatus for Throwing the Wheels Into and Out of Action of a Vehicle Having Both Wheels and Endless Tracks, for which an application for patent was made in France October 19, 1918, Patent No. 500,472, and of which the following is a complete specification.

This invention refers to apparatus for throwing the wheels into and out of action in a vehicle having both wheels and endless tracks as means of progression, and is a division of the application filed November 22, 1919, Serial No. 339,903. It has been recognized as necessary to construct, for example, for the transport of artillery and the requirements of agriculture an automobile vehicle capable of drawing or carrying a load on roads, across fields or over all kinds of uneven ground, and for this purpose vehicles have been constructed with two means of progression, one being ordinary wheels and the other endless tracks.

This invention provides a construction of apparatus in an automobile or other vehicle, having wheels and endless tracks and capable of drawing directly or by towage, or of carrying a load over any kind of ground, whereby either of these two methods of progression may be brought into use at will in a rapid and convenient manner, one being suitable for roads and permitting of the attainment of rapid speeds for prolonged periods and the other being suitable for various kinds of ground to be traversed away from roads.

It is obvious that the invention may be applied to a motor or other vehicle having two or more wheels for transporting loads of all kinds.

In the accompanying drawings which represent by way of example various modes of carrying out the invention:

Figure 1 represents a constructional form of the apparatus for throwing the wheels out of action constituted by jointed levers.

Fig. 2 shows an apparatus for throwing the wheels out of action by jointed arms.

Fig. 3 is a sectional view of one of the wheel carrying arms and the locking means therefor.

In Fig. 1, 1 represents the endless track. 2 is the shaft of the sprocket on which is pivoted an operating lever 3, to which are attached the ends 4 and 5 of the suspension spring 6. 7 is the axle provided with its wheel. The lever 3 is provided with a pin 9 slidably mounted therein and a handle 10, and the frame is provided with a hole 11 to receive the pin.

To work the apparatus the endless tracks are caused to rise up on wedges to a height sufficient to bring the wheel 8 out of contact with the ground, then at this moment the lever 3 is raised until the pin 9 is opposite the hole 11, when by engaging the pin with the hole the wheels are held in inoperative position.

Figs. 2 and 3 represent an apparatus for throwing the wheels out of action by means of jointed arms applied to the front or rear wheels. There is arranged at the front of frame a train of steering wheels 49 mounted on pivots on their axle with a steering parallelogram as in an ordinary automobile vehicle. The axle is rigidly connected to two arms 50 jointed at 51 to the longitudinal bearers of the frame. To the frame is secured the angular lug 52 and above the lug and spaced therefrom is a second lug 53. The lugs are rabbeted to form a guideway 54 to receive a key 55 which is provided with a lug 56 on its outer face. To lock the arm 50 in position, it is lowered until it rests upon the angular lug 52 and then the key 55 is inserted in the guideway 54 of said lugs with the lug 56 thereof engaging the upper face of the said arm, when the arm will be firmly and securely locked in its lowered position. This arrangement offers the advantage of avoiding all jamming of the keying devices, all expenditure of force for disconnecting, and of reducing the time necessary for changing.

In order to throw the front wheels out of action, the endless tracks are caused to ride on wedges until the moment when the front wheels are raised off the ground. The jointed arms 50 are then disconnected from the locking device and the steering rod disconnected from the member 57 which insures the connection between the steering rod and the steering parallelogram. The train of front wheel is then raised into the position of rest and is secured.

What I claim is:

1. In an apparatus for transforming a vehicle propelled on endless tracks into a vehicle propelled on wheels, the combination of a pivoted wheel carrying member, and a locking device for said member, said locking device comprising a seat for the member, and a slidable member arranged at one side of the seat and having a member projecting above the seat and engaging the wheel carrying member to hold it in the seat.

2. In an apparatus for transforming a vehicle propelled on endless tracks into a vehicle propelled on wheels, the combination of a pivoted wheel carrying member, and a locking device for said member, said locking device comprising two spaced fixed members, one of the members forming a seat for the wheel carrying member, and a key slidably mounted between the said members and having a lug on its outer face.

3. In an apparatus for transforming a vehicle propelled on endless tracks into a vehicle propelled on wheels, the combination with the frame, of arms pivoted to the frame, wheels carried by the arms, two spaced lugs secured to the frame, one of the lugs being angular to form a seat for an arm, and both lugs rabbeted to form a guideway, and a key slidably mounted in the guideway and having a lug on its outer face.

In testimony whereof I have hereunto set my hand at Paris, France, this 29" day of Sept., 1920.

EMILE RIMAILHO.